Feb. 14, 1961 J. J. MISKEL ET AL 2,971,309
APPARATUS FOR LOADING ARTICLES INTO PARTITIONED CARTONS
Filed May 2, 1957 8 Sheets-Sheet 3
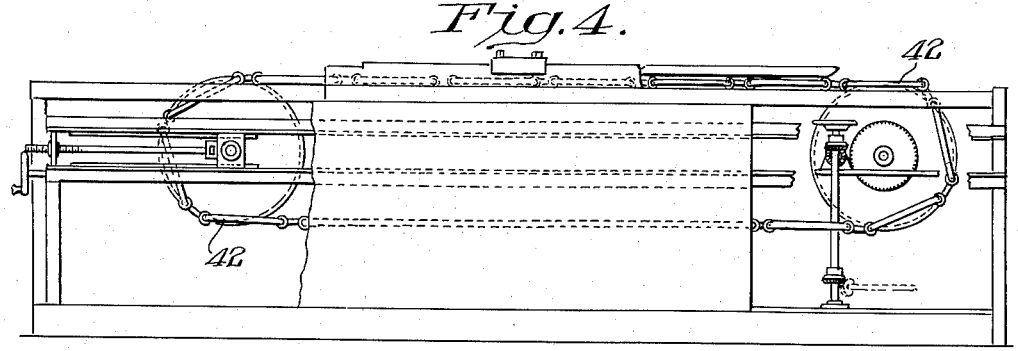
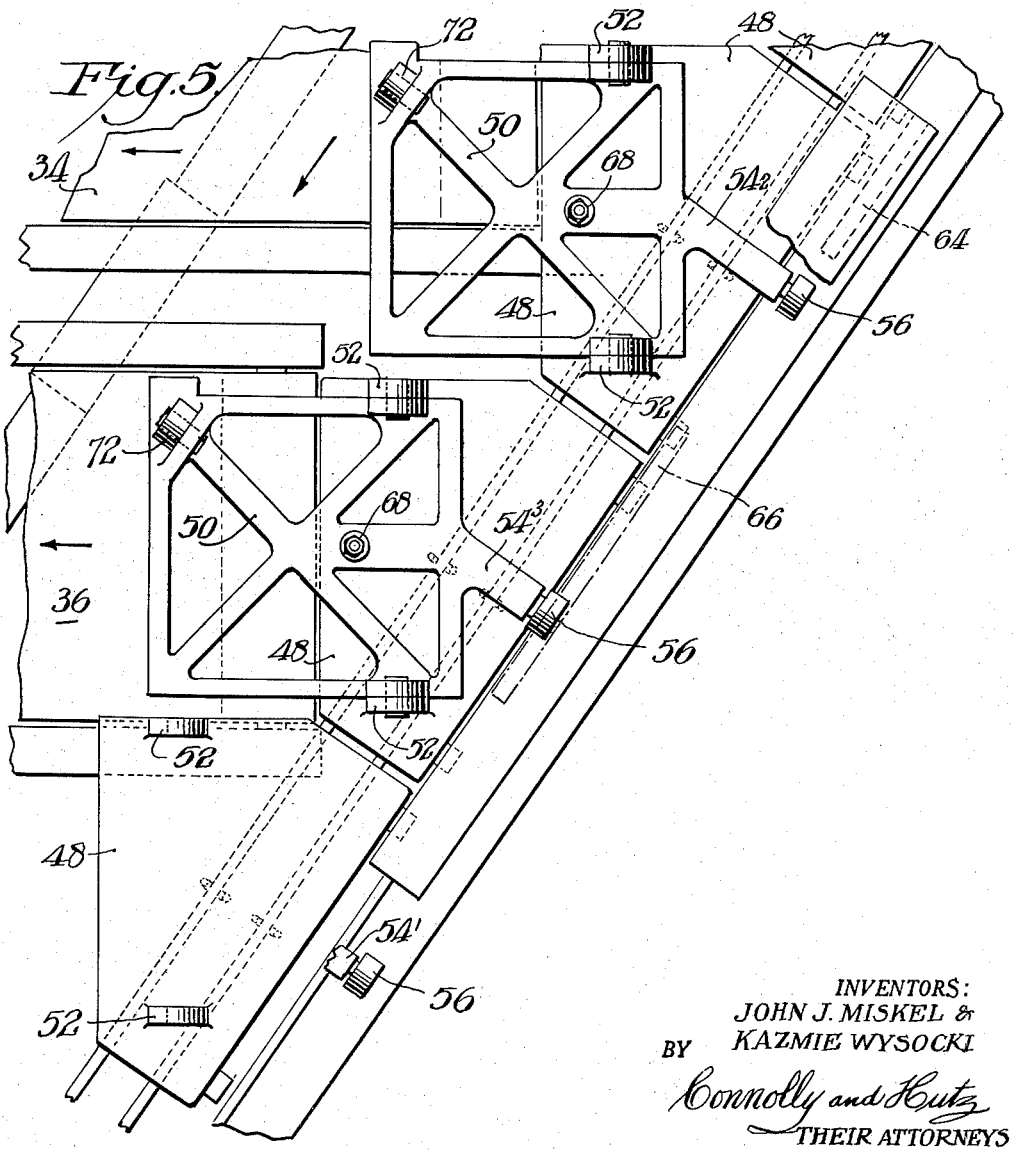
INVENTORS:
JOHN J. MISKEL &
BY KAZMIE WYSOCKI
Connolly and Hutz
THEIR ATTORNEYS

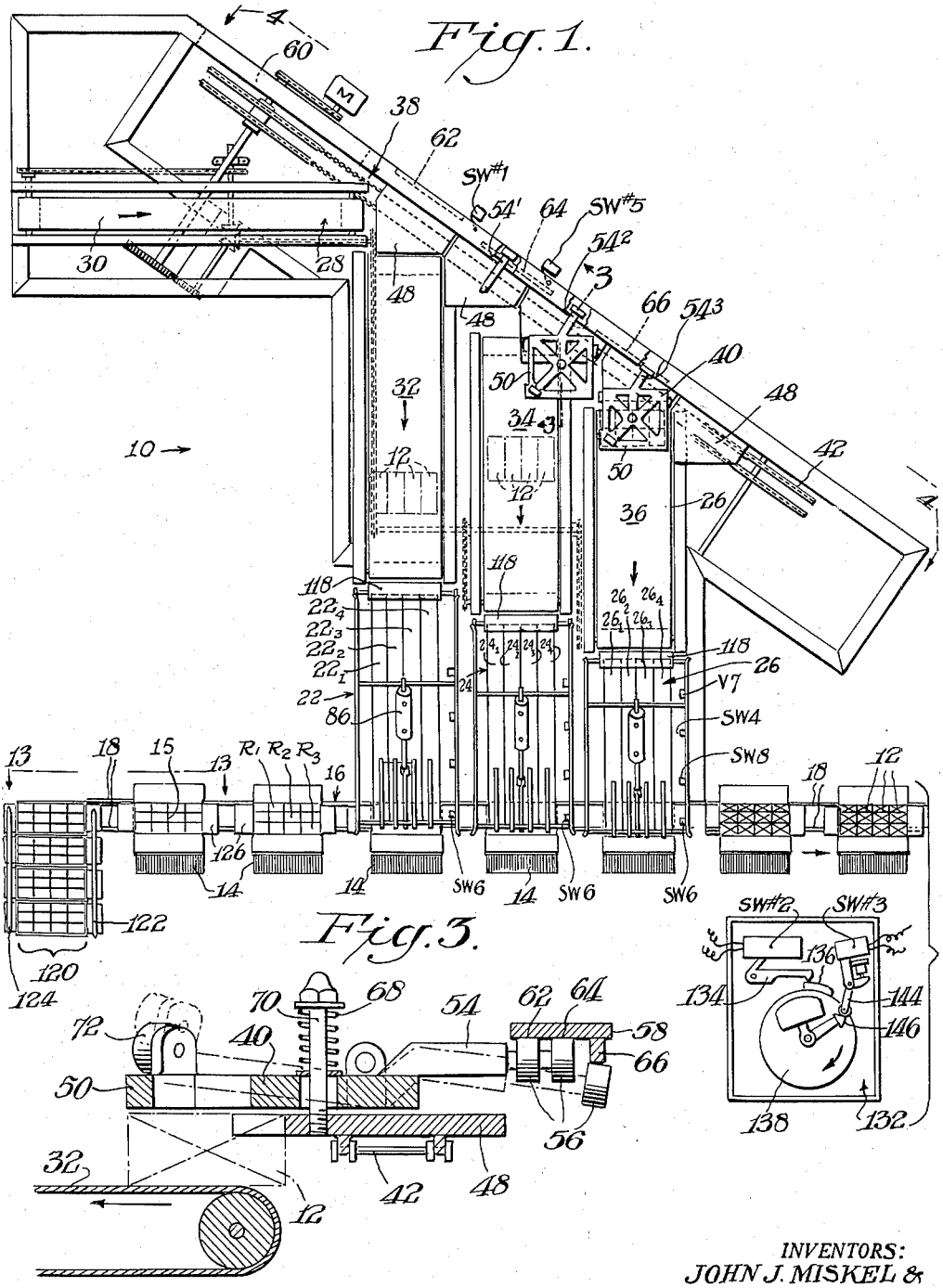

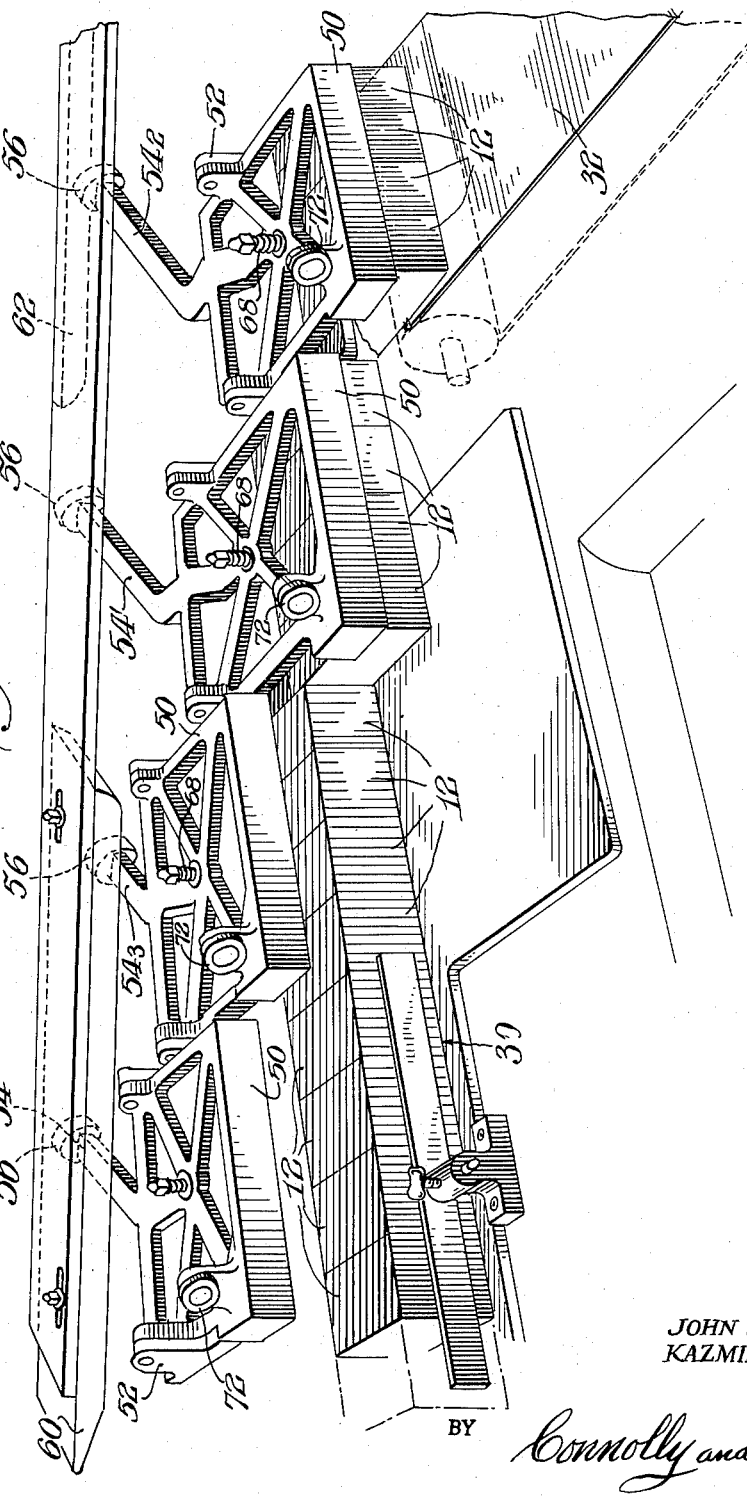

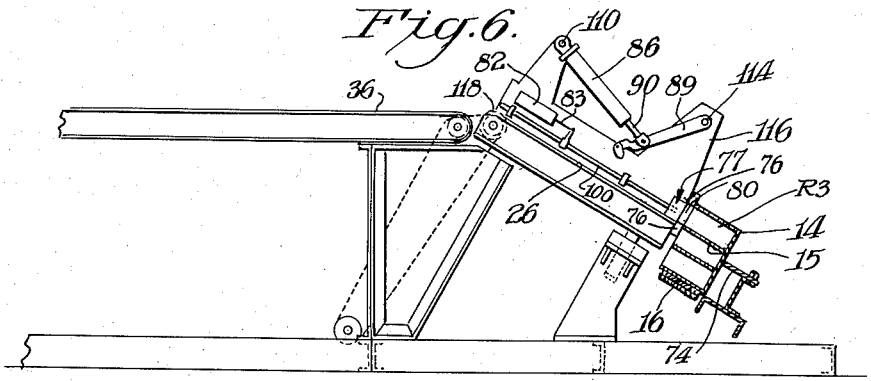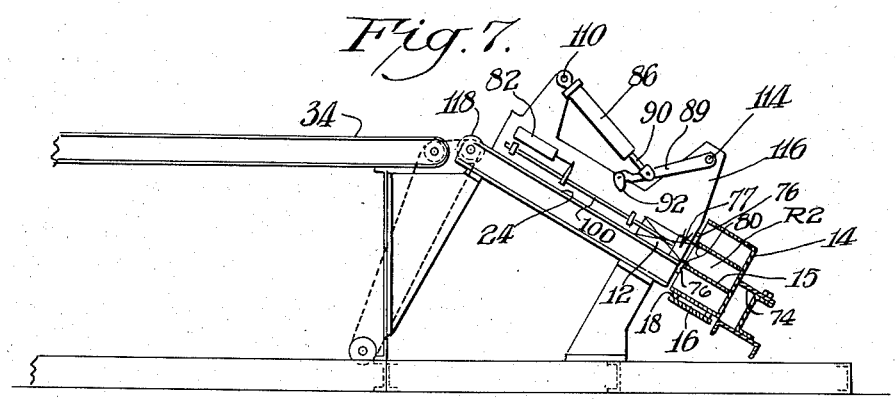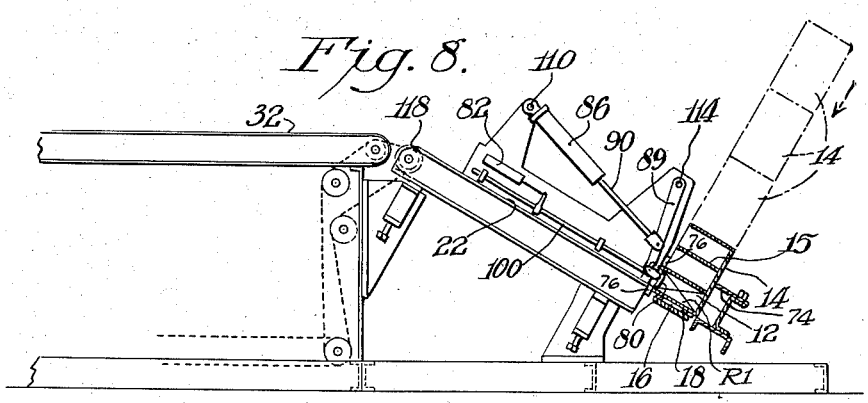

Feb. 14, 1961 J. J. MISKEL ET AL 2,971,309
APPARATUS FOR LOADING ARTICLES INTO PARTITIONED CARTONS
Filed May 2, 1957 8 Sheets-Sheet 5
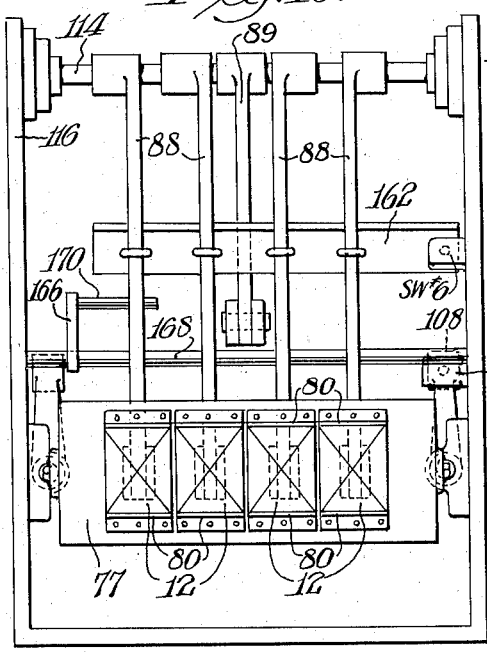
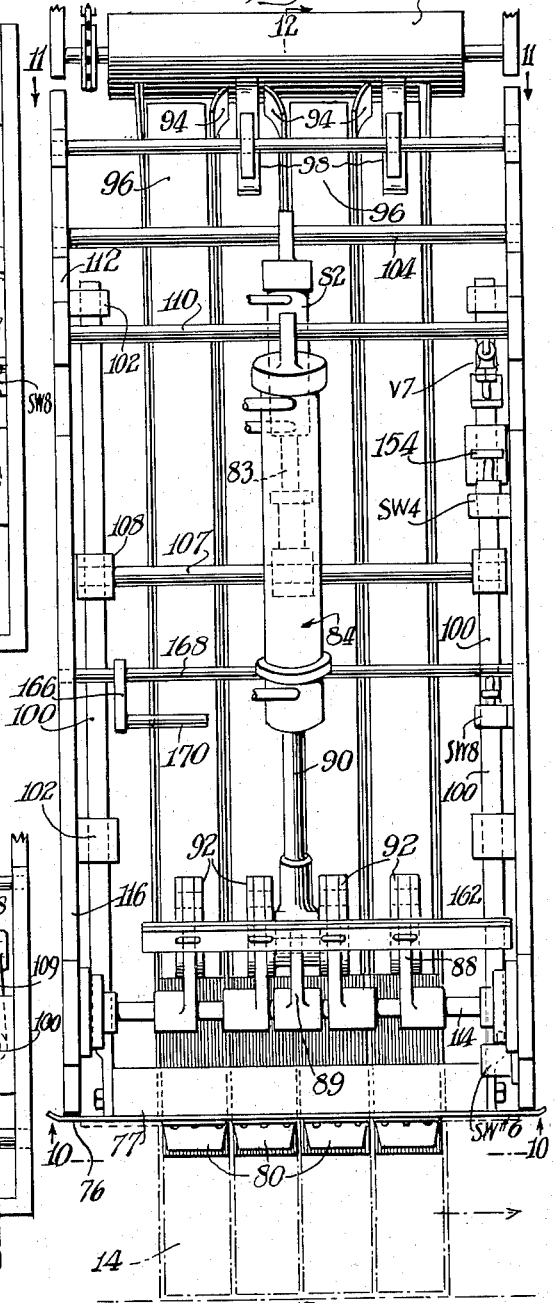
INVENTORS:
JOHN J. MISKEL &
KAZMIER WYSOCKI
BY Connolly and Hutz
THEIR ATTORNEYS

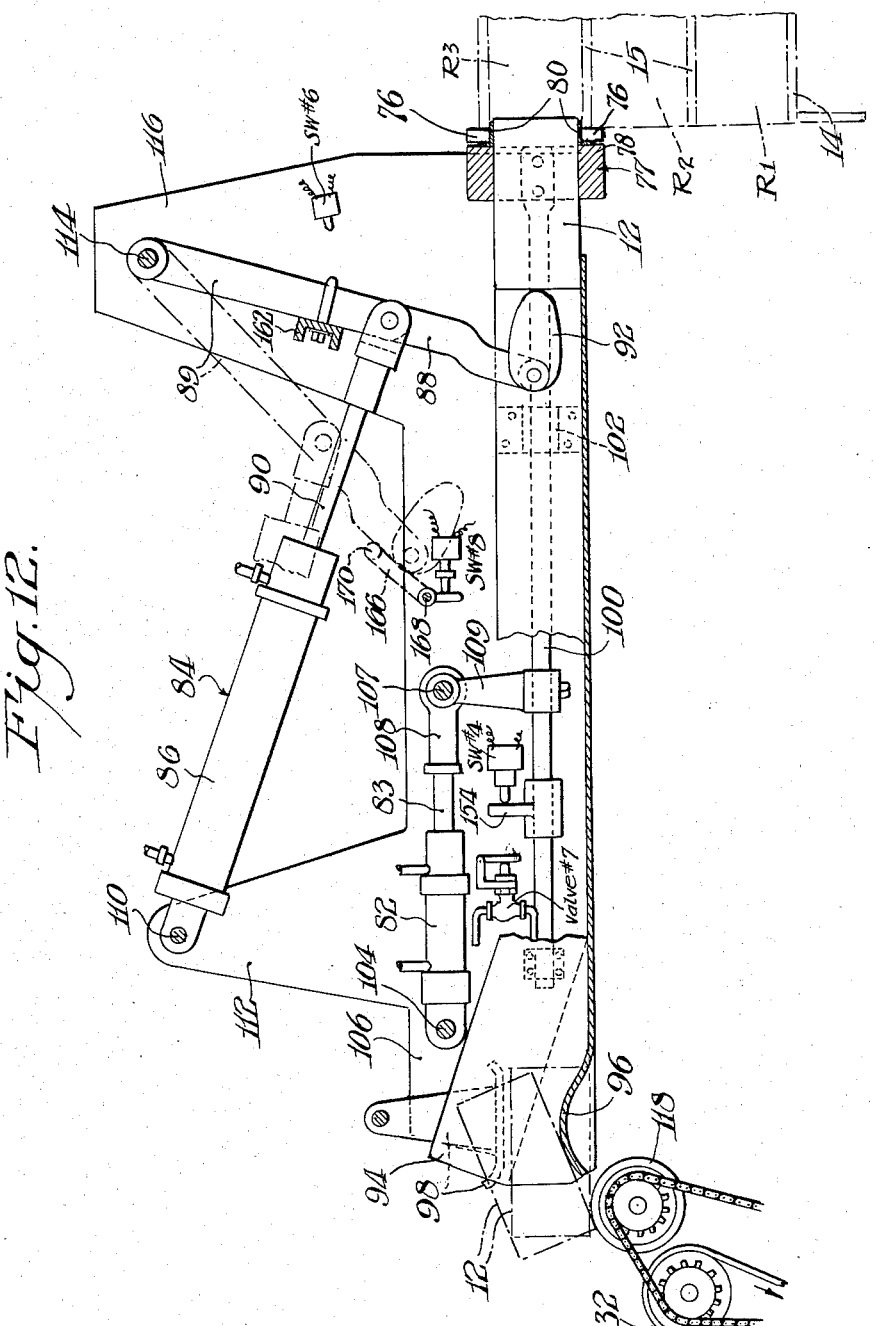

Feb. 14, 1961 J. J. MISKEL ET AL 2,971,309
APPARATUS FOR LOADING ARTICLES INTO PARTITIONED CARTONS
Filed May 2, 1957 8 Sheets-Sheet 7
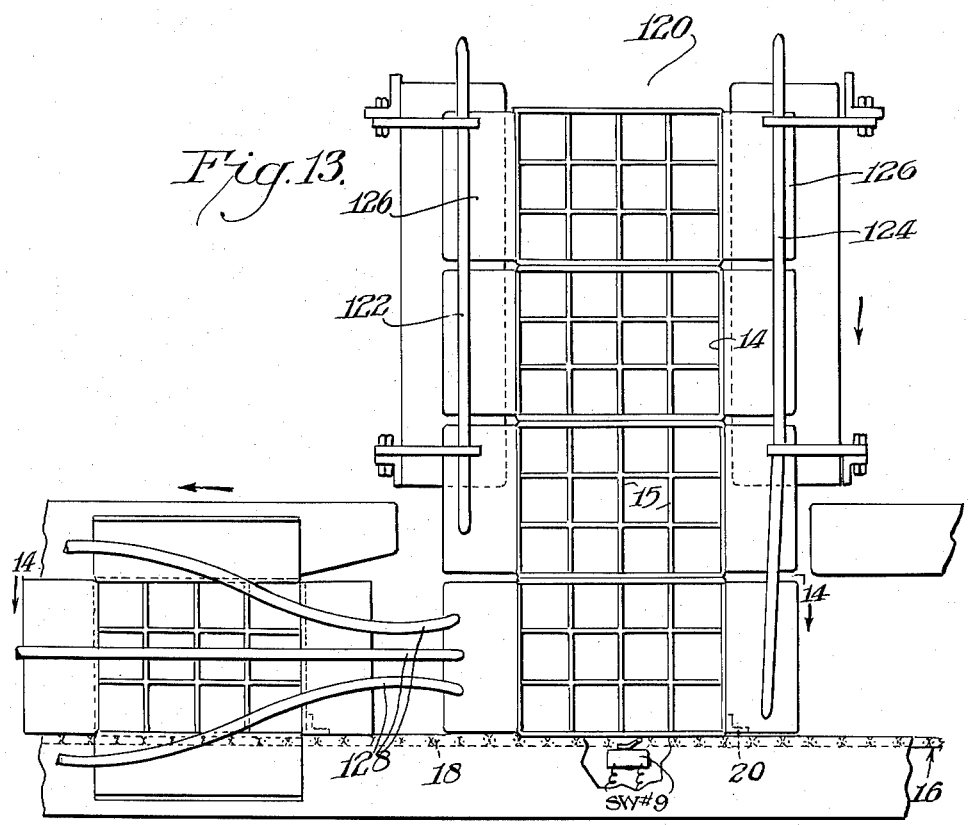
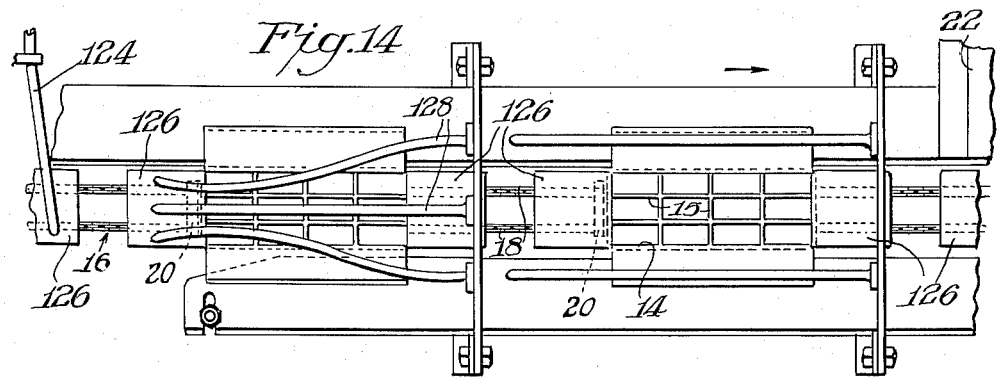
INVENTORS:
JOHN J. MISKEL &
KAZMIER WYSOCKI
BY Connolly and Hutz
THEIR ATTORNEYS

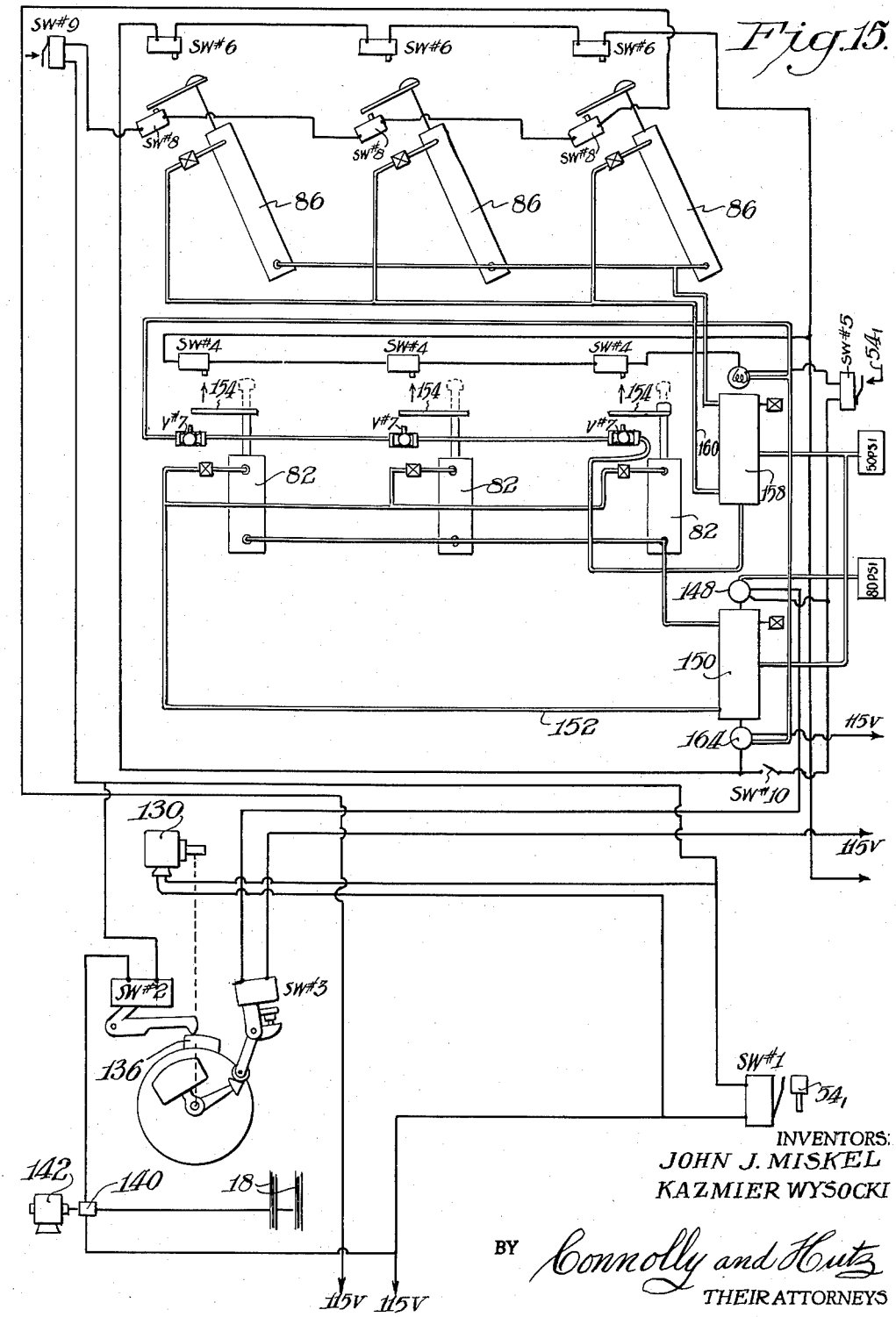

United States Patent Office 2,971,309
Patented Feb. 14, 1961

2,971,309
APPARATUS FOR LOADING ARTICLES INTO PARTITIONED CARTONS

John J. Miskel, Brooklyn, N.Y., and Kazmier Wysocki, Maywood, N.J., assignors to Chas. Pfizer & Co., Inc., Brooklyn, N.Y., a corporation of Delaware Filed May 2, 1957, Ser. No. 656,581

14 Claims. (Cl. 53—240)

This invention relates to an apparatus for automatically loading articles into cartons having rows of partitions, and more particularly relates to an apparatus of the aforementioned type in which boxed articles are loaded in groups corresponding to the number of partitions in successive rows of the cartons.

In view of the high cost of labor at this time, it is advantageous for a manufacturer to be able to perform time-consumling operations such as packaging in the most automatic manner that is economically attainable. A satisfactory automatically operating apparatus, however, should be relatively simple and dependable in operation and be capable of consistent operation with a minimum of supervision.

An object of this invention is to provide a relatively simple rugged and dependable apparatus for loading articles into partitioned cartons which is consistently dependable in operation with a minium of supervision.

In accordance with this invention, partitioned cartons are advanced successively with their open ends adjacent channelled chutes. The delivery ends of these chutes are aligned with individual rows of partitions to deliver individual rows of articles as the cartons successively advance from one chute to the next. After traversal in front of all of the chutes, each carton, therefore, has its rows of partitions successively filled with articles. An article supply means is operatively aligned with the entrances to each of the chutes to provide groups of articles corresponding to the number of partitions in each of the rows in the cartons. Control means are provided for advancing the cartons from one chute to the next and corresponding distances beyond, only after a group of articles has been deposited in each of the rows of partitions. This control means may be actuated in accordance with the phase of operation of the supply means, which may be continually operating; and the control means may be thereafter governed by a timed cycle and interreacting phases of operation. Guide fingers for channelling articles into the partitions and pushers for insuring that the articles are completely inserted into the partitions may be advantageously associated with each of the chutes. These means may be conveniently operated by pneumatic cylinders.

Novel auxiliary means associated with the apparatus may include a means for preventing snagging of the articles at the entrance to the channels of the chutes. This snagging prevention may be provided by raising and lowering the floors at the entrances to adjacent channels and by raising and flaring the separators between the channels. This smoothly diverts half of the articles into the entrances to higher channels, and the articles entering the lower channels are guided by the sides of the raised channels and a depressing finger.

Other novel auxiliary devices, which may be incorporated in this apparatus, are a continuously operating conveyor and intermediate conveyor belts which are aligned with the entrances to each of the chutes. Furthermore, a pick-off conveyor, including a series of traps, may move at an angle across the path of travel of the continuously operating conveyor and the intermediate conveyors to abstract groups of articles corresponding in number to the partitions in a row of the carton. This pick-off conveyor releases each of these groups upon respective successive intermediate conveyors. The gates of the traps may be conveniently operated by follower means associated with the gates and a stationary cam track disposed adjacent the path of travel of the pick-off conveyor.

Novel features and advantages of the present invention will become apparent to one skilled in the art from a reading of the following description in conjunction with the accompanying drawings wherein similar reference characters refer to similar parts and in which:

Fig. 1 is a plan view of an embodiment of this invention;

Fig. 2 is a perspective view of a portion of the embodiment shown in Fig. 1 including the pick-off conveyor and traps;

Fig. 3 is a cross-sectional view taken through Fig. 1 along the line 3—3 and looking in the direction of the arrows;

Fig. 4 is a cross-sectional view taken through Fig. 1 along the line 4—4 and looking in the direction of the arrows;

Fig. 5 is an enlarged plan view of a portion of the pick-off conveyor and traps shown in Fig. 1;

Fig. 6 is a cross-sectional view taken through Fig. 1 along the line 6—6 and looking in the direction of the arrows;

Fig. 7 is a cross-sectional view taken through Fig. 1 along the lines 7—7 and looking in the direction of the arrows;

Fig. 8 is a cross-sectional view taken through Fig. 1 along the line 8—8 and looking in the direction of the arrows;

Fig. 9 is an enlarged plan view of one of the chutes shown in Fig. 1;

Fig. 10 is a cross-sectional view taken through Fig. 9 along the line 10—10 and looking in the direction of the arrows;

Fig. 11 is a cross-sectional view taken through Fig. 9 along the line 11—11 and looking in the direction of the arrows;

Fig. 12 is a cross-sectional view taken through Fig. 9 along the line 12—12 and looking in the direction of the arrows;

Fig. 13 is a cross-sectional view taken through Fig. 1 along the line 13—13 and looking in the direction of the arrows;

Fig. 14 is a cross-sectional view taken through Fig. 13 along the line 14—14 and looking in the direction of the arrows; and Fig. 15 is a schematic diagram of a control system for the embodiment shown in Fig. 1.

*Overall description*

Fig. 1 is a plan or overhead view of an apparatus 10 for loading articles 12, filled boxes for example, into partitioned cartons 14. The term "boxes" is herein used to designate the smaller articles to be placed or loaded into the partitioned carton 14 and the term "carton" is used to designate the larger containers partitioned by separators 15, which receive the boxes. This designation is arbitrary, but it shall be adhered to in order to differentiate between the articles and the container into which they are loaded.

At the lower portion of Fig. 1 is shown a conveyor 16 including a sprocket chain 18, for example, having carrying lugs 20 (shown in Figs. 13 and 14) spaced at a distance equal to the width of a carton 14 to carry the containers from left to right, for example, adjacent the delivery ends of channelled chutes 22, 24 and 26, three in number for example. There are three loading chutes in this apparatus because there are three horizontal rows of partitions in cartons 14. These rows of partitions are designated by $R_1$, $R_2$ and $R_3$ respectively to indicate the rows of partitions from the lowest to the highest. As is later rescribed in detail, chutes 22, 24 and 26 respectively deposit a group of articles 12 in lowest row $R_1$, central row $R_2$, and highest row $R_3$.

The channels in each of the chutes are designated by suffixes corresponding to their relative positions reading from left to right in Fig. 1. Chute 22, therefore, includes channels $22_1$ to $22_4$. Chute 24 includes channels $24_1$ to $24_4$, and chute 26 includes channels $26_1$ to $26_4$.

Article supply

Supply means 28 provides articles to the entrances to chutes 22, 24 and 26. Supply means 28 includes, for example, a continuously operating conveyor 30 of the belt type, for example, and intermediate continuously operating conveyor belts 32, 34 and 36 respectively aligned with chutes 22, 24 and 26. A pick-off conveyor 38 for abstracting groups of articles equal in number to the partitions in a horizontal row of cartons is disposed in position to intersect the paths of conveyor 30 and intermediate conveyors 32, 34 and 36. Abstracting or pick-off conveyor 38 includes, for example, a succession of traps 40 which move at an acute angle, for example, to conveyor 30 and intermediate conveyors 32, 34 and 36. Traps 40 are moved, for example, in succession upon a continuous sprocket chain conveyor 42 (shown in detail in Fig. 4). A single drive input to shaft 44 and related geared transmission elements 46 continuously causes conveyors 30, 32, 34 and 36 and sprocket conveyor 42 to move in synchronized relationship.

Traps 40 are shown in Fig. 1 and in greater detail in Figs. 2–5. Reference to Figs. 1–5 indicates that traps 40 include a base plate 48 and a gate 50 which is rotatably mounted upon base plate 48 by hinge assemblies 52. Gates 50 are operated to open and close by means of arms 54 including a follower or roller 56. Arms 54 are of varying length. Each length arm corresponds to a chute or horizontal row of partitions in a carton. Referring to Fig. 1, the longest arm is designated as $54_1$ corresponding to the chute which loads row $R_1$. The next longest arm is designated $54_2$ corresponding to the center chute 24 which loads the center row $R_2$, and the shortest arm is designated $54_3$ to correspond to the highest chute 26 which loads the highest row $R_3$.

Rollers 56 ride below a flat rail 58 which extends parallel to sprocket conveyor 42. Rail 58 includes on its undersurface a series of projecting cam tracks 60, 62, 64 and 66 disposed at positions where corresponding gates are to be opened. Cam track 60, for example, is positioned in the path of travel of all of the rollers 56 and is longitudinally disposed adjacent continuously operating article conveyor belt 30 to raise all of the gates 50 prior to dropping them over a group of four boxes 12 in order to abstract a group of four boxes from conveyor 30 and carry them to corresponding intermediate conveyor belts 32, 34 and 36.

Referring to Fig. 2, the gates including arms $54_2$ and $54_3$ are held open by passage of their rollers 56 under cam track 60 to prepare them for dropping over a group of four articles 12. Arm $54_1$, however, has passed cam track 60 and moved upwardly into contact with rail 58 to allow its associated gate 50 to drop over and abstract a group of four articles 12. The undersurface of gate 50 is shaped to entrap and restrain the group of boxes 12 as it is moved from conveyor belt 30 to the intermediate conveyors.

Referring once more to Fig. 2, the other gate 50 associated with another arm $54_2$ is moving past intermediate conveyor belt 32 on its way to its corresponding intermediate conveyor belt 34. Its roller 56 is not in contact with track 62, so it remains in the lowered or closed condition to effectively confine its group of four boxes beneath it.

However, when the gate 50 associated with the longest arm $54_1$ moves into longitudinal alignment with track 62, its roller 56 will be aligned and in contact with cam track 62 to raise gate 50 and release its group of boxes 12 upon intermediate conveyor 32. When gate 50 associated with arm $54_2$ arrives in line with cam track 64, it will be raised to release its boxes upon intermediate conveyor 34, and when the gate associated with arm $54_3$ moves into contact with cam track 66, it is raised to permit its boxes to be carried along intermediate conveyor 36.

A spring 68, a compression spring for example, is mounted about a stud 70 on base plates 48 to bias gates 50 into the horizontal or closed position (see Fig. 3). Traps 40 also include an additional roller 72 mounted upon a forward corner of gates 50 to support the weight of the gates by riding on a track on the return portion of their travel on sprocket chain 42 as shown in Fig. 4.

Chute and auxiliary equipment

In Figs. 6–12 are shown details of the chutes 22, 24 and 26, and auxiliary apparatus mounted thereon for insuring that the articles are fully inserted into the partitions of the cartons. Figs. 6, 7 and 8 respectively indicate how chutes 26, 24 and 22 initiate from a common level at the outlet ends of intermediate conveyors 36, 34 and 32. The delivery ends of chutes 26, 24 and 22, however, are aligned with respective successively lower horizontal rows of partitions $R_3$, $R_2$, and $R_1$ of cartons 14. Each chute, therefore, loads a single horizontal row of articles in a carton 14. After a carton 14 has passed in front of all three chutes, it has, therefore, received its full complement of articles.

Figs. 6, 7 and 8 also illustrate how carton 14 is carried adjacent the outlet ends of the chutes by means of the sprocket chain conveyor 16 at its lower side and a plate or track 74 upon which the bottom of the carton slides. This presses the open end of the carton firmly against the rails 76 at the exits from each of the chutes.

Each chute includes an apertured block 78 at its loading or delivery end. Each block 78 includes an aperture corresponding to each of the channels in the chute, for example, four apertures. A pair of guide or spring fingers 80 extend convergently about these apertures, for example at top and bottom. These fingers are inserted into the partitions of cartons 14 to insure that boxes 12 do not snag on the separators 15 which form the partitions of cartons 14. Linkage means 77 are provided for inserting the spring fingers 80 into the partitions before an article moves into the partition and for subsequently retracting the spring fingers to permit movement of cartons 14 to their next loading position. Blocks 78 are operated by pneumatic cylinders 82 which hereafter will be referred to as guide cylinders.

Pusher means 84 are also provided for insuring that the boxes are inserted completely within the partitions before the carton is advanced to the next station. This pusher assembly 84 includes a pneumatic cylinder 86, four pusher links 88 and a center connecting link 89 connected as a unit assembly by bar 162, plunger rod 90 coupled to link 89 and four pusher feet 92 rotatably coupled to the lower ends of links 88.

In Figs. 9–12 are shown details of a chute 22, for example, and its auxiliary equipment and associated control devices. Figs. 9 and 10 show a novel channeling means for preventing snagging of the boxes as they enter channels $22_1$ to $22_4$. The floors at the entrances to these channels are alternately disposed at relatively high and low levels so that articles passing into the lower channels $22_2$ and $22_4$ pass beneath the upwardly directed and outwardly flared separators 94 which form the walls of the channels. These relatively high and low floors are produced, for example, by providing humps 96 (Fig. 12) in the floors of channels $22_3$ and $22_1$ at the entrances to these channels. These humps raise boxes passing into these channels up to the level of the raised and outwardly flared separators to smoothly channel them into channels $22_3$ and $22_1$. Boxes in the relatively lower or level channels $22_4$ and $22_2$, however, pass beneath the outwardly flared entrances to channels $22_3$ and $22_1$ and, therefore, pass unimpeded into their respective channels. Curved diverters 98 are mounted above the entrances to lower or level channels $22_4$ and $22_2$ to cooperate with the adjacent edges of raised humps 96 in diverting the boxes into lower channels $22_4$ and $22_2$.

Figs. 6, 7, 8 and 12 also clearly show how a roller 118 of material having relatively high frictional grasping properties is interposed between the ends of the intermediate conveyors and the entrances to the chutes to assist in propelling boxes 12 from the exits of the intermediate conveyor into the entrances of the chutes, particularly over humps 96.

In Figs. 9 and 12 are shown details of the guide finger actuating assembly 77. Assembly 77 includes an apertured block 78 with spring guide fingers 80 at its forward end. Block 78 is moved backwards and forwards by a pair of rods 100 secured to its ends on both sides of the path of travel of boxes traveling through channels $22_1$ to $22_4$. Rod 100 is supported in bearings 102, for example, and is moved back and forth by guide cylinder 82 whose end is rotatably anchored to a bar 104 secured across the sides 106 of chute 22. Guide cylinder plunger 83 is rotatably secured to rod 107 by means of a pivoted bracket 108. Rod 107 is secured to rods 100 by means of brackets 109. Air guide cylinder 82, therefore, imparts a forward and backward movement to block 78 and guide fingers 80 which are inserted and retracted through rails 76 from the partitions of the cartons at predetermined times which are later described.

Further assemblies 84 include the elements previously described, and Figs. 9, 11 and 12 clearly show how the end of the pusher cylinder 86 is rotatably secured to a shaft 110 extending across raised extensions 112 of sides 106 of chute 22, for example. These figures also show how links 88, aligned with each channel, are rotatably supported by suitable bearings on a shaft 114 extending across the raised plates 116 at the forward end of the sides 106 of the chutes.

Carton conveyor

In Figs. 1, 13 and 14, is shown means for feeding cartons to sprocket conveyor 16. This carton feeding means includes a vertical slot 120 which intersects conveyor 16 at a point ahead of the first chute 22. Slot 120 includes guide bars 122 and 124 for holding the lateral flaps 126 of the cartons open as they drop towards conveyor 16. Additional guide bars 128 are disposed about the portion of conveyor 16 adjacent carton feeding slot 120 to maintain the lateral flaps opened and to force the upper and lower flaps into an opened condition before the opened ends of the cartons are pressed adjacent face plates 76 of the chutes.

Control system

The various components of the control system are principally shown in Figs. 1, 12 and 15. These components are described in the order in which they operate in a single illustrative operative loading cycle.

Switch No. 1 is mounted adjacent the path of travel of pick-off conveyor 38 with its actuating arm disposed, for example in the path of travel of the longest or index arms $54_1$. Arms $54_1$ are associated with gates 50 which release their boxes to intermediate conveyor 32 and chute 22. Switch No. 1 is longitudinally positioned between cam track 62, which opens the gates related to intermediate conveyor 32, and track 64, which opens the gates related to intermediate conveyor 34. Switch No. 1 is electrically connected to single cycle timer motor 130. Every time an arm $54_1$ contacts switch No. 1, the single cycle timer motor 130 rotates timer assembly 132 through one cycle.

Switch No. 2 is installed in timer assembly 132 and has a follower arm 134 which contacts a projection 136 on cam element 138 rotated by timer motor 130. Switch No. 2 is electrically connected to interrupt the travel of carton conveyor 18 after the cartons have moved a distance equal to the distance between the centers of the chutes. It is accordingly connected, for example, to magnetic clutch and brake unit 140 which is interposed between drive motor 142 and carton conveyor 16. After the carton conveyor 16 has commenced to move in response to the momentary closure of switch No. 1, its travel is interrupted by the momentary opening of switch No. 2.

Switch No. 3 is also included within timer assembly 132 and includes a follower arm 144 which contacts a pointed projection 146 mounted upon cam 138. Switch No. 3 is electrically connected in the circuit to forward pilot valve 148 which is operatively associated with four-way valve 150 which is connected by means of tubing 152 to guide cylinders 82. Pilot valve 148 and four-way valve 150 are, for example, conventional pneumatic control equipment. Switch No. 3, upon closure, therefore, actuates guide cylinders 82 and linkages 77 to insert guide fingers 80 into the partitions of the cartons in front of their respective chutes.

Switches No. 4 are mounted on one of the sides 106 of each of the chutes in front of lugs 154 attached to rods 100 of guide finger operating linkages 77. When lugs 154 move forward together with linkages 77, they actuate switches No. 4. Switches No. 4 are electrically connected in the circuit to pilot valve 156 operatively associated with four-way valve 158 which is connected by tubing 160 to control movement of pusher cylinders 86. Switches No. 4, however, merely energize their circuit because of the open-circuit condition which is maintained until switch No. 5 is also closed.

Switch No. 5 is mounted adjacent the path of travel of pick-off conveyor 38, for example, in the path of travel of the longest or index arms $54_1$ associated with the gates 50 which drop their groups of articles upon intermediate conveyor 32. Switch No. 5 is electrically connected in the energized circuit to pilot valve 156, and it, therefore, causes plungers 90 of pusher linkages 84 to move forward to cause pusher feet 92 to fully insert articles 12 into the partitions of the cartons disposed in front of their respective chutes. Switch No. 5 is disposed a sufficient distance past switch No. 1 to permit all of the articles dropped upon the intermediate conveyors to fully traverse the intermediate conveyors and chutes and either pass completely into the partitions of containers 14 or to lie at the entrances thereto. When switch No. 5 is closed, pusher feet 92 move forward to the position shown in Fig. 8 to insure that all of the articles are fully inserted into the cartons.

Switches No. 6 are mounted on extensions 116 of a side 106 of each of the chutes in the path of travel of bars 162 extending across and connecting all of the pusher links 88 to which the pusher feet 92 are attached. Switches No. 6 are, therefore, actuated when the pusher links 88 are driven fully ahead. Switches No. 6 are electrically connected in the circuit to reversing pilot valve 164 operatively associated with four-way valve 150 which controls operation of the guide cylinders 82. When switch No. 6 is actuated, pilot valve 164 actuates four-way valve 150 to retract plungers 83 into guide cylinders 82 which retract blocks 78 and guide fingers 80 from the partitions of the cartons.

Valves No. 7 are mounted adjacent the backward path of travel of lugs 154 on rods 100 of guide finger linkages 77. Retraction of guide finger linkages 77, therefore, actuates valves No. 7. Valves No. 7 are connected to the reversing portion of four-way valve 158 which controls pusher cylinders 86. Actuation of valves No. 7, therefore, retracts pusher plungers 90 and pusher linkages 84.

Switches No. 8 are installed on a side 106 of each of the chutes in position to be connected by linkages 166 connected to shafts 168 which are connected across the sides 106 of each of the chutes (see Fig. 9). Operating cranks 170 are secured to shafts 168 in a position to be contacted by the backs of pusher links 88 when pusher linkages 84 are retracted. Switches No. 8 are electrically connected in the circuit to single cycle timer motor 130 so that it can not be started by actuation of switch No. 1 unless all of the pusher linkages are retracted.

Switch No. 9 (see Figs. 1, 13 and 14) is installed at the bottom of slot 120 into which the cartons 14 are loaded. Switch No. 9 is electrically connected in the circuit to timer assembly 132 so that a cycle of operation can not be initiated unless cartons are being delivered to conveyor 16.

Manually operable switch No. 10 is mounted on a control panel (not shown), for example, and it is electrically connected in the cricuit to pilot valves 148 and 156 to provide a manually operable means for retracting guide cylinder linkages 77 and pusher linkages 84 at the discretion of an operator supervising apparatus 10.

*Summary of operation*

Articles 12 are continuously supplied to apparatus 10 on continuously operating conveyor 30. Traps 48 on pick-off conveyor 38 are maintained open by means of cam track 60 as they approach the intersection of pick-off conveyor 38 with conveyor 30. The open condition is clearly illustrated in Fig. 2 by the depression of arm $54_3$ by track 60 to maintain gate 50 open directly above a group of four articles 12. The preceding gate 50 has just been closed over a group of four articles by the upward movement of arm $54_1$ against plate 58. A group of articles 12 has thereby been abstracted by trap 48 associated with arm $54_1$ and started on its movement toward its related intermediate conveyor 32. When gate 50 associated with arm $54_1$ arrives in front of intermediate conveyor 32, arm $54_1$ is depressed by the contact of its roller 56 with cam track 62. This opens the trap to release containers 12 which are moved forward towards chute 22 by intermediate conveyor 32. The gate associated with arm $54_2$, however, has not been depressed because it is shown with its roller 56 extending under and past cam track 62. When arm $54_2$ moves up to cam track 64, however, its roller 56 contacts cam track 64 to open the gate in position to release its articles to its related intermediate conveyor 34. The same sequence of events occurs with respect to the gate associated with the arm $54_3$ when its roller 56 contacts cam track 66 in position to release its articles to intermediate conveyor 36.

Fig. 1 shows the positions of the groups of articles after they have been released to intermediate conveyors 32, 34 and 36 by the substantially simultaneous contact of rollers 56 with respective cam tracks 62, 64 and 66 related to intermediate conveyors 32, 34 and 36. Each group of four articles is, therefore, released to the intermediate conveyors, for example, before the longest or index arm $54_1$ has contacted switch No. 1 to start timer 132. The groups of boxes are, therefore, continually supplied or started on their way to their respective horizontal rows of partitions in the boxes 14 before timer 132 has been started to advance the cartons to their respective chutes for the next loading cycle.

The speed of carton conveyor 16, however, is sufficiently rapid to advance the cartons to the next loading position before the boxes have had sufficient time to traverse the intermediate conveyors and the chutes. Movement of carton conveyor 16 is initiated by actuation of switch No. 1 which engages the clutch and releases the brake of clutch and brake assembly 140. The subsequent actuation of switch No. 2 by projection 136 of timer 130 opens the clutch and sets the brake of assembly 140 at a time which stops carton conveyor 16 after an elapsed movement which precisely positions a set of three cartons 14 in front of their respective chutes. It is apparent that the carton in front of chute 22 is initially completely empty, the carton in front of chute 24 initially has its lowest row $R_1$ previously filled by chute 22, and the carton in front of chute 26 initially has had its two lowest rows $R_1$ and $R_2$ respectively filled by chutes 22 and 24. After the carton passes beyond chute 26, it has all of its rows of partitions $R_1$, $R_2$ and $R_3$ completely full of articles 12.

After the motion of the cartons has been stopped by actuation of switch No. 2, switch No. 3 is actuated by timer 132 to insert spring fingers 80 within the partitions of the cartons, as shown in Figs. 7 and 12. This is accomplished before the articles have had time to move down the chutes so that they are then able to pass directly into the partitions without snagging on the edges of separators 15 of cartons 14. The articles 12 previously have been smoothly guided into their respective channels of the chutes by means of the novel configuration including the alternately high and low floors and the assisting action of frictional rollers 118.

The electrical circuit to pilot valve 156 associated with the pusher cylinder four-way valve 158 is energized by the closure of switch No. 4 by the contact of lugs 54 which have moved forward together with guide finger linkages 77. Switch No. 5 is then contacted by arm $54_1$ to actuate pusher cylinders 86 and linkages 84 to drive pusher feet 92 forward and fully insert the articles 12 into their respective partitions of cartons 14. Some of these articles may have already passed into the partitions by virtue of the momentum attained in sliding down the chutes, and the forward motion of pusher feet 92 insures that all are fully inserted.

The forward motion of pusher links 88 and attached bar 162 actuates switches No. 6 which are connected to return pilot valve 164 of guide cylinder four-way valve 150. This causes guide cylinders 82 to retract linkages 77 and guide fingers 80 which frees the cartons for movement to the next loading phase.

When guide linkages 77 are retracted, lugs 54 actuate valves No. 7 connected in the return portion of four-way valve 158 to retract pusher cylinder plungers 90 and feet 92 from the channels of the chutes. This clears the chutes for subsequent traversal by the next group of articles.

When the pusher links 88 move backward, they contact cranks 170 (see Fig. 9) to rotate linkages 166 in a direction to actuate switches No. 8. Switches No. 8, therefore, energize the timer circuit to prepare it for operation by the next actuation of switch No. 1 by the next index or longest arm $54_1$. Each set of three arms of varying length, therefore, drop their boxes upon respective intermediate conveyors and chutes whereby they are fully inserted within respective partitions by means of guide finger linkages 77 and the pusher linkages 84.

The full loading cycle is completed before the next set of arms carry their groups of articles in position to release them to their respective intermediate conveyors. The timer circuit has been energized by actuation of switches No. 8 which is the last phase of the loading cycle. This prepares the control circuit and apparatus for the initiation of the next cycle when the next longest or index arm $54_1$ arrives at switch No. 1.

What is claimed is:

1. An apparatus for loading articles into cartons having rows of partitions comprising a loading chute for each row of partitions, conveyor means for advancing said cartons in a substantially straight-line path with their open ends adjacent said loading chutes, a supporting structure maintaining the end of each of said loading chutes adjacent said cartons at a level corresponding to an individual row of said partitions, supply means aligned with the entrance to each of said chutes for delivering groups of articles corresponding to the number of partitions in each of said rows to said chutes, control means operatively associated with said supply means and said carton conveyor means for providing a cycle of operation in which said cartons are advanced a distance equal to the distance between the centers of said chutes after a group of articles have been supplied and have traversed each of said chutes and passed into said cartons, a guide finger means is operatively associated with said chutes, said guide finger means including an aperture aligned with each of the channels of each of said chutes, guide fingers being disposed on opposite sides of said apertures for guiding articles passing down said channels into the partitions of said cartons, a movable linkage is operatively associated with said guide finger means for inserting them into said partitions during a predetermined phase of said cycle, pusher means being operatively associated with each of said chutes, said pusher means including a pusher foot operatively aligned with each of said channels for inserting articles disposed in each of said channels at the mouth of said carton into said carton, an actuating linkage being operatively associated with said pusher feet for alternately moving said pusher feet into said channels and retracting them during predetermined respective phases of said cycle, said control means including a single cycle timer for controlling movement of said carton conveyor and said guide finger means, a cycle initiating switch being operatively associated with said article supplying means, said cycle initiating switch being actuated to start said timer at a predetermined phase in relation to the time of delivery of said articles to said chutes, said timer being associated with switch means for first stopping said carton conveyor after said cartons have moved a distance equal to the distance between the centers of said chutes and then inserting said guide fingers into said partitions, a pusher-actuating switch operatively associated with said supply means for actuating said pushers to drive said articles into said partitions a predetermined time after said articles have been delivered to said chutes, a guide head retracting switch operatively associated with said chutes in a position to be actuated by forward movement of said pushers for retracting said guide fingers from said partitions after said pushers have inserted said articles into said partitions, and pusher return actuating means operatively associated with said chutes in a position to be actuated by the return movement of said guide finger means for retracting said pushers after said guide fingers have been retracted.

2. An apparatus as set forth in claim 1 wherein a pusher actuating circuit is provided, and an energizing switch means for said circuit is operatively associated with each of said chutes in a position to be closed by the inserting movement of said guide finger means.

3. An apparatus as set forth in claim 1 wherein said timer energizing switch means is operatively associated with said pusher means in position to be actuated by return movement of said pushers to permit said timer to be actuated in the normal manner only when all pusher means are retracted.

4. An apparatus for loading articles into cartons having rows of partitions comprising a loading chute for each row of partitions, conveyor means for advancing said cartons in a substantially straight-line path with their open ends adjacent said loading chutes, a supporting structure maintaining the end of each of said loading chutes adjacent said cartons at a level corresponding to an individual row of said partitions, supply means aligned with the entrance to each of said chutes for delivering groups of articles corresponding to the number of partitions in each of said rows to said chutes, control means operatively associated with said supply means and said carton conveyor means for providing a cycle of operation in which said cartons are advanced a distance equal to the distance between the centers of said chutes after a group of articles have been supplied and have traversed each of said chutes and passed into said cartons, a guide finger means is operatively associated with said chutes, said guide finger means including an aperture aligned with each of the channels of each of said chutes, guide fingers being disposed on opposite sides of said apertures for guiding articles passing down said channels into the partitions of said cartons, a movable linkage is operatively associated with said guide finger means for inserting them into said partitions during a predetermined phase of said cycle, pusher means being operatively associated with each of said chutes, said pusher means including a pusher foot operatively aligned with each of said channels for inserting articles disposed in each of said channels at the mouth of said carton into said carton, an actuating linkage being operatively associated with said pusher feet for alternately moving said pusher feet into said channels and retracting them during predetermined respective phases of said cycle, said pusher means and guide finger means being operatively associated with pneumatic cylinders, pneumatic valve means being provided for actuating said pneumatic cylinders, and electrically operable pilot means being operatively engaged with each of said valve means for operating said valves at predetermined portions of said cycle.

5. A pick-off conveyor for transferring groups of articles from a continuously operating conveyor to an intermediate conveyor, said continuously operating conveyor means being constructed and arranged to supply a steady stream of articles, said pick-off conveyor means being arranged to intersect the paths of said continuously operating article supplying conveyor and said intermediate article conveyor, said pick-off conveyor including trap means for abstracting groups of articles from said continuously operating conveyor and for releasing said groups of articles to said intermediate conveyors, a group of said trap means being provided, said group including a trap means corresponding to each of said intermediate conveyors, and release means being connected with said pick-off conveyor and operatively associated with said trap means for simultaneously opening said trap means and releasing said groups of articles to said intermediate conveyors when said traps are aligned with corresponding conveyors.

6. A pick-off conveyor for transferring groups of articles from a continuously operating conveyor to intermediate conveyors, said continuously operating conveyor being constructed and arranged to supply a steady stream of articles, said pick-off conveyor being arranged to intersect the paths of said continuously operating conveyor and said intermediate conveyors, said pick-off conveyor including trap means for abstracting groups of articles from said continuously operating conveyor and for releasing said groups of articles to said intermediate conveyors, said pick-off conveyor intersecting said continuously operating conveyor and said intermediate conveyors at an angle, said pick-off conveyor including a succession of traps which are aligned with the articles upon said continuously operating conveyor as they intersect it, said traps including gates for abstracting and confining said groups of articles, and gate operating means being operatively associated with said gates for closing said gates when they intersect the path of said continuously operating conveyor to abstract said groups of articles therefrom and for opening said gates when they intersect the path of said intermediate conveyors to release said groups of said articles thereto.

7. An apparatus as set forth in claim 6 wherein said traps include base plates, said gates are rotatably secured to said base plates, and said gate operating means includes a follower means operatively associated with said traps, and a stationary cam track is disposed adjacent to the path of travel of said pick-off conveyor.

8. An apparatus as set forth in claim 7 wherein a succession of intermediate conveyors are provided, said traps being successively related to respective successive intermediate conveyors, said cam track means including separate tracks related to each of said intermediate conveyors, said separate tracks being arranged to close said traps at said continuously operating conveyor to abstract said groups of articles therefrom and to open the gate of each trap in position to release said articles to said respective intermediate conveyor.

9. An apparatus as set forth in claim 8 wherein said cam follower means are disposed on arms of varying length associated with said gates, said arms varying in length in accordance with the position of its respective cam track, each arm associated with a gate related to a particular intermediate conveyor being of the same length, and said cam track including separate tracks associated with respective intermediate conveyors and said tracks are disposed in the path of travel of the follower of related gates to open said gates when said traps are in position to release said articles to said respective intermediate conveyors.

10. A means for smoothly introducing articles into separate channels comprising separators between each of said channels, the floors at the entrances to said channels being alternately relatively high and low, said separators being raised to engage the sides of articles entering said higher channels and to miss the sides of articles entering said lower channels, the ends of said separators being flared outwardly to prevent snagging of articles entering said higher channels, and the relatively higher floors of said higher channels assisting in directing articles entering said lower channels into them without snagging.

11. A chute as set forth in claim 10 wherein depressing means are operatively associated with each of said lower channels for directing articles entering said lower channels below the flared ends of said separators and away from the raised floors of said upper channels to prevent snagging of said articles entering said lower channels.

12. An apparatus as set forth in claim 10 wherein a roller of material having frictional grasping properties with respect to said articles is disposed in front of the entrance to said channels for insuring delivery of articles into said channels.

13. An apparatus for loading articles into cartons having rows of partitions comprising a loading chute for each of said rows of partitions; conveyor means for advancing said cartons in a substantially straight-line path with their open ends adjacent said loading chutes; a supporting structure maintaining the end of each of said loading chutes adjacent said cartons at a level corresponding to an individual row of said partitions; supply means aligned with the entrance to each of said chutes for delivering groups of articles corresponding to the number of partitions in each of said rows to said chutes; said supply means being disposed in one plane and said carton conveyor being disposed in a relatively lower plane; said chutes being disposed between said upper plane and the respective levels of said rows of partitions in said cartons; a control means operatively associated with said supply means and said carton conveyor means for providing a cycle of operation in which said cartons are intermittently advanced a distance equal to the distance between the centers of said chutes as each group of articles traverses each of said chutes and passes into said cartons; said supply means including a continuously operating conveyor, an intermediate conveyor arranged to deposit a group of articles upon each of said chutes, and a pick-off conveyor intersecting said continuously operating conveyor and said intermediate conveyors; said pick-off conveyor including a series of trap means for abstracting groups of articles from said continuously operating conveyor and for releasing said groups to successive intermediate conveyors; said trap means becoming aligned with said groups of articles upon said continuously operating conveyor as they intersect it; said traps including gates for abstracting and confining said groups of articles; gate operating means being operatively associated with said gates for closing said gates when they intersect the path of said continuously operating conveyor for abstracting said groups of said articles therefrom and for opening said gates when they intersect the path of said intermediate conveyors to release said groups of said articles thereto; a guide finger means operatively associated with each of said chutes; each of said guide finger means including an aperture aligned with each of said channels of each of said chutes; a movable linkage operatively associated with each of said guide finger means for inserting them into said partitions during a predetermined phase of said cycle; pusher means operatively associated with each of said chutes; each of said pusher means including a pusher foot operatively aligned with each of said channels for inserting articles disposed in each of said channels at the mouth of said carton into said carton; an actuating linkage operatively associated with each of said pusher feet for alternately moving said pusher feet into said channels and retracting them during predetermined respective phases of said cycle; said chutes being channeled by separators in accordance with the number of articles in each of said groups; diverting means associated with the entrances to said separators for smoothly introducing said articles into said channels and preventing snagging upon said separators, said diverting means comprising floors at the entrances to said channels which are alternately relatively high and low; said separators being raised to engage the sides of articles entering said higher channels and to miss the sides of articles entering said lower channels; the ends of said separators being flared outwardly to prevent snagging of articles entering said higher channels; and the relatively higher floors of said higher channels assisting in directing articles entering said lower channels into them without snagging.

14. An apparatus for loading articles into cartons having rows of partitions comprising a loading chute for each of said rows of partitions; conveyor means for advancing said cartons in a substantially straight-line path with their open ends adjacent said loading chutes; a supporting structure maintaining the end of each of said loading chutes adjacent said cartons at a level corresponding to an individual row of said partitions; supply means aligned with the entrance to each of said chutes for delivering groups of articles corresponding to the number of partitions in each of said rows to said chutes; said supply means being disposed in one plane and said carton conveyor being disposed in a relatively lower plane; said chutes being disposed between said upper plane and the respective levels of said rows of partitions in said cartons; a control means operatively associated with said supply means and said carton conveyor means for providing a cycle of operation in which said cartons are intermittently advanced a distance equal to the distance between the centers of said chutes as each group of articles traverses each of said chutes and passes into said cartons; said supply means including a continuously operating conveyor, an intermediate conveyor arranged to deposit a group of articles upon each of said chutes, and a pick-off conveyor intersecting said continuously operating conveyor and said intermediate conveyors; said pick-off conveyor including a series of trap means for abstracting groups of articles from said continuously operating conveyor and for releasing said groups to successive intermediate conveyors; said trap means becoming aligned with said groups of articles upon said continuously operating conveyor as they intersect it; said traps including gates for abstracting and confining said groups of articles; gate operating means being operatively associated with said gates for closing said gates when they intersect the path of said continuously operating conveyor for abstracting said groups of said articles therefrom and for opening said gates when they intersect the path of said intermediate conveyors to release said groups of said articles thereto; a guide finger means operatively associated with each of said chutes; each of said guide finger means including an aperture aligned with each of said channels of each of said chutes; a movable linkage operatively associated with each of said guide finger means for inserting them into said partitions during a predetermined phase of said cycle; pusher means operatively associated with each of said chutes; each of said pusher means including a pusher foot operatively aligned with each of said channels for inserting articles disposed in each of said channels at the mouth of said carton into said carton; an actuating linkage operatively associated with each of said pusher feet for alternately moving said pusher feet into said channels and retracting them during predetermined respective phases of said cycle; said chutes being channelled by separators in accordance with the number of articles in each of said groups; and diverting means associated with the entrances to said separators for smoothly introducing said articles into said channels and preventing snagging upon said separators.

References Cited in the file of this patent

UNITED STATES PATENTS

| | | |
|---|---|---|
| 1,126,731 | Dowling | Feb. 2, 1915 |
| 1,733,547 | Lorenz | Oct. 29, 1929 |
| 1,766,574 | Westin et al. | June 24, 1930 |
| 2,133,248 | Jones | Oct. 11, 1938 |
| 2,312,060 | Kimball | Feb. 23, 1943 |
| 2,408,838 | Wilckens et al. | Oct. 8, 1946 |
| 2,471,214 | Hope | May 24, 1949 |
| 2,685,993 | Currivan | Aug. 10, 1954 |
| 2,815,623 | Holslebroe et al. | Dec. 10, 1957 |
| 2,828,595 | Talbot et al. | Apr. 1, 1958 |
| 2,835,087 | Engleson et al. | May 20, 1958 |